United States Patent [19]

Taghezout

[11] Patent Number: 4,754,210

[45] Date of Patent: Jun. 28, 1988

[54] METHOD OF AND A DEVICE FOR CONTROLLING A STEPPING MOTOR

[75] Inventor: Daho Taghezout, Peseux, Switzerland

[73] Assignee: Asulab SA, Bienne, Switzerland

[21] Appl. No.: 53,201

[22] Filed: May 22, 1987

[30] Foreign Application Priority Data

Jun. 26, 1986 [CH] Switzerland ........................ 02585/86

[51] Int. Cl.[4] ................................................ H02P 8/00

[52] U.S. Cl. ...................................... 318/696; 318/685

[58] Field of Search .................. 318/696, 685; 157/76, 157/157

[56] References Cited

U.S. PATENT DOCUMENTS 4,340,946 7/1982 Kammo et al. ........................ 368/76

FOREIGN PATENT DOCUMENTS 0128865 4/1985 European Pat. Off. .

OTHER PUBLICATIONS 10 eme Gongress International De Chronometrie, No. 3, Sep. 1979, pp. 53-59, Büren, Ch; J.-L. Beguin, "Generateur de Signauk Programmables", FIGS. 1,2.

Patent Abstracts of Japan, vol. 5, No. 51 (E-51) [723], Apr. 10, 1981; & JP-A-56, 1799 (Daini Seikosha K.K.), 09-01-1981.

*Primary Examiner*—William M. Shoop, Jr.
*Assistant Examiner*—Saul M. Bergmann
*Attorney, Agent, or Firm*—Sughrue, Mion, Zinn, Macpeak, and Seas

[57] ABSTRACT

The method and the device described are intended to avoid the dissipation of electrical energy that occurs in the coil of a stepping motor when the coil is short-circuited permanently between two drive pulses. The method comprises short-circuiting the coil at the end (t1) of the drive pulse, then putting it on open circuit at the instant (t2) when the current (Ic) flowing through it during the short-circuit becomes zero, and short-circuiting the coil again at the instant (t3) when the voltage induced in it by the rotation of the rotor while the coil is on open circuit becomes zero or reaches a predetermined value (Ud). The device is designed to carry out the method. The invention is applicable to the control of stepping motors of the type for instance that are fitted in electronic timepieces having a hand display.

4 Claims, 3 Drawing Sheets

METHOD OF AND A DEVICE FOR CONTROLLING A STEPPING MOTOR

BACKGROUND OF THE INVENTION

1. Field of the Invention

This invention relates to a method of and a device for controlling a stepping motor of the type having a coil and a rotor that is mechanically coupled to a mechanical load and having a permanent magnet that is magnetically coupled to the coil.

The method is of the kind comprising:

applying a drive pulse to the coil whenever the rotor is required to rotate by one step;

short-circuiting the coil a first time at the end of the drive pulse;

returning the coil to open circuit; and short-circuiting the coil a second time until the beginning of the next drive pulse.

And the device is of the kind comprising:

first means for causing a drive pulse to be applied to the coil whenever the rotor is required to rotate by one step;

second means for causing the coil to be short-circuited a first time at the end of the drive pulse;

third means for causing the coil to be returned to open circuit after the first short-circuiting operation; and fourth means for causing the coil to be short-circuited a second time after the circuit is opened.

2. Prior Art

Stepping motors of the above type are known and are to be found, in particular, in most electronic timepieces using a hand display.

In such timepieces, the rotor of the motor usually comprises a permanent bipolar magnet whose magnetization axis is perpendicular to the rotation axis of the rotor. This magnet is magnetically coupled to the coil of the motor via a stator comprising a substantially cylindrical opening in which the rotor revolves. Notches made in the wall of the opening apply to the rotor a positioning torque which tends to hold it or to return it to one or another of two stable equilibrium positions.

Such a motor, not shown as it is well known, is used as an example in the following description.

The control circuits of the motors are arranged to apply to the coil a drive pulse whenever the rotor is required to rotate by one step.

In the simpler cases, the length of the drive pulses is fixed. The amount of electrical energy supplied to the motor during the drive pulses is therefore practically independent of the mechanical load it drives. The length of the drive pulses must be sufficient for the rotor to rotate properly even when the mechanical load it drives is at its highest value. But since the load is only rarely at its highest value, a large proprotion of the electrical energy is wasted. The electrical energy is usually provided, particularly in timepieces, by a supply source of limited capacity. Many devices have thus been proposed for reducing the energy consumption of the motor.

All these devices comprise means for determining, in one way or another, the value of the mechanical load being driven by the rotor, and for adjusting the amount of electrical energy supplied to the motor during the drive pulses to the value of the said load.

This adjustment of the amount of electrical energy being supplied to the motor is usually obtained by altering the duration of the drive pulses.

This duration may be determined directly during each drive pulse, as described for instance in U.S. Pat. No. 4,446,413. In such a case, a circuit measures, during each drive pulse, an electrical magnitude that depends on the mechanical load being driven by the rotor of the motor. This circuit generates a signal that causes the current drive pulse being applied to be interrupted when certain conditions are satisfied, these conditions being defined by the nature of the circuit.

The duration of the drive pulses may also be determined indirectly, as described for instance in U.S. Pat. No. 4,272,837. In such a case, a circuit measures, after the drive pulses, a characteristic electrical magnitude that is dependent on the mechanical load which was being driven by the rotor during the drive pulses. If the result of this measurement satisfies certain conditions which are also determined by the nature of the circuit, this indicates that the rotor did not rotate properly in response to the previous drive pulses, and the measurement circuit generates a signal that causes a change in the duration of the following drive pulses. If necessary, the signal generated by the circuit also causes one or several correction pulses to be applied to the motor in order to cause the rotor to perform the step or steps it did not perform in response to the previous pulses.

Most of the control devices mentioned above are arranged so that the coil of the motor is short-circuited, between the end of each drive pulse and the beginning of the next.

This short-circuiting of the motor's coil is performed, in particular, to prevent the rotor from rotating by more than one step if, for some reason, the electrical energy supplied to the motor during a drive pulse is much greater than required, and to cause, between the drive pulses, an electrical braking torque to be applied to the rotor in response to some inadvertent rotation of the rotor due to, for instance, a shock. This electrical braking torque combines with the positioning torque referred to earlier to hold the rotor in the position it is in.

The duration of the drive pulses generated by the devices described above is usually shorter than the time needed for the rotor to reach an angular position from which the positioning torque has a direction and a value such that it can cause, with no external energy supply, the rotor to rotate to its next position of stable equilibrium.

The angular position described above is referred to as threshold angular position in the following description.

This threshold angular position is not fixed, as it depends on the friction which hinders the rotation of the rotor, and is variable.

Between the end of the drive pulse and the instant when the rotor reaches its threshold angular position, the rotor continues to rotate in response to, in particular, its own kinetic energy and that of the various elements it drives.

Furthermore, the short-circuiting of the coil at the end of the drive pulse enables current to carry on flowing within the coil. The greater part of the magnetic energy that is present in the coil at the end of the drive pulse can thus be converted into mechanical energy which cooperates with the kinetic energy of the rotor and of the elements driven thereby to cause the rotor to rotate towards the threshold angular position. Only part of the magnetic energy is dissipated in the form of heat due to the flow of current through the coil.

However, the current in the coil decreases rapidly after the end of the drive pulse. After reaching zero, this current changes direction and the motor begins to operate as a generator.

The electrical energy it then generates, and which is entirely dissipated in the coil in the form of heat, is attributable solely to the conversion of part of the kinetic energy of the rotor and of the elements driven thereby. The rotor is thus braked, and its kinetic energy must overcome the sum of the positioning torque, of a first resisting torque due to the mutual friction of these mechanical elements and of the friction of their pivots in their bearings, of a second resisting torque due to the magnetic phenomena within the motor's stator, and of the torque caused by the electric braking action.

The change in direction of the current, and hence the beginning of the braking action on the rotor, occurs before the rotor reaches the threshold angular position mentioned above. It is therefore necessary for that part of the kinetic energy which is not converted into electrical energy to be sufficient for the rotor to reach the threshold angular position in spite of the braking action.

In other words, the electrical energy that needs to be supplied to the motor for the rotor to rotate properly is made up of a useful part, which is converted into mechanical energy, and of a part which can be considered useless and which is entirely dissipated in the coil after the current in the latter changes direction in the way described above.

Theoretical calculations confirmed by practical tests have shown that, depending on the type of the motor and on the kind of circuit being used for controlling it, the useless electrical energy mentioned above can amount to 25% of the minimum electrical energy that needs to be supplied to the motor for its rotor to rotate properly.

The known methods of and devices for controlling stepping motors therefore suffer from the drawback of causing a substantial drop in the efficiency of the motor. The energy that is uselessly dissipated in the motor must of course be supplied by the electrical supply source of the device. It follows therefore that for a given capacity and hence a given volume of the source its lifetime is substantially shortened or that for a given lifetime of the source its volume needs to be substantially increased.

U.S. Pat. No. 4,467,255 describes a method of controlling a stepping motor wherein, unlike what has been described above, the motor's coil is put on open circuit for a fixed length of time after the end of each drive pulse and is then short-circuited until the beginning of the following drive pulse. The variation in the voltage that is induced in the coil by the rotor's rotation after the end of the drive pulse is used to determine whether the rotor has properly rotated in response to the previous drive pulses.

The drawback of this method is that the magnetic energy that is present in the coil at the end of the drive pulse cannot be converted into mechanical energy since the coil is put on open circuit at that time.

A modification of this method that enables the above drawback to be partly removed is also described in U.S. Pat. No. 4,467,255. In this modification, the coil of the motor is short-circuited at the end of each drive pulse for a fixed, predetermined length of time, before being put on open circuit for another fixed length of time and then being short-circuited again until the beginning of the following drive pulse.

However, the rate at which the current decreases after the coil is first short-circuited depends not only on the characteristics of the coil, but also on the speed reached by the rotor at the end of the drive pulse and thus on the mechanical load driven by the rotor. This rate of decrease of the current is therefore variable. If the length of time that is set for the first short-circuiting operation is shorter than the time taken by the current to become nil, part of the magnetic energy of the coil is not converted into mechanical energy and is therefore lost. But if the length of time that is set for the first short-circuiting operation is longer than the time taken by the current to become nil, the latter changes sign and causes the useless energy dissipation described above.

Further, in the method disclosed in U.S. Pat. No. 4,467,255, the length of time during which the coil is put on open circuit before being short-circuited again is also fixed.

As the speed of the rotor at the end of the drive pulse and after the latter depends on the mechanical load driven by the rotor, the angular position of the rotor at the instant the coil is again short-circuited is variable.

If this angular position is located before the threshold angular position defined above, the rotor is braked by this short-circuiting operation, and again part of its kinetic energy is uselessly dissipated.

If the angular position of the rotor at the time of the short-circuiting operation is close to its second position of stable equilibrium, it could be that its kinetic energy is sufficient to cause it to go beyond the second position of stable equilibrium and reach the next. In such a case, the rotor thus performs two steps instead of one.

The efficiency and reliability of a motor controlled by the method disclosed in U.S. Pat. No. 4,467,255 are therefore not satisfactory.

SUMMARY OF THE INVENTION

An object of the invention is to provide a method and a device of the kind set forth such that the above-mentioned drawbacks may be eliminated, i.e. such as to achieve greater efficiency of the stepping motor being controlled, than with the known methods, in particular a longer lifetime of the supply source of the device that is provided with the motor for a given source volume or, for a given source lifetime, a smaller source volume, without in so doing reducing the reliability of the watch.

BRIEF DESCRIPTION OF THE DRAWINGS

In the accompanying drawings, given by way of example.

It will become clear in the following description that the control circuits for carrying out the described method can equally well be constant voltage circuits or constant current circuits.

As implied by their name, constant voltage circuits apply to the coil of a motor a substantially constant voltage throughout each drive pulse. This constant voltage is usually that of the supply source of the device provided with such a circuit. Similarly, constant current circuits cause a substantially constant current to flow through the coil of a motor throughout each drive pulse.

It will also become clear from the following description that the circuits for carrying out the method according to the invention may equally well be of the type that generate drive pulses of fixed duration or of the type that adjust the duration of the drive pulses in any one of the many known ways.

DETAILED DESCRIPTION

Figure 1:
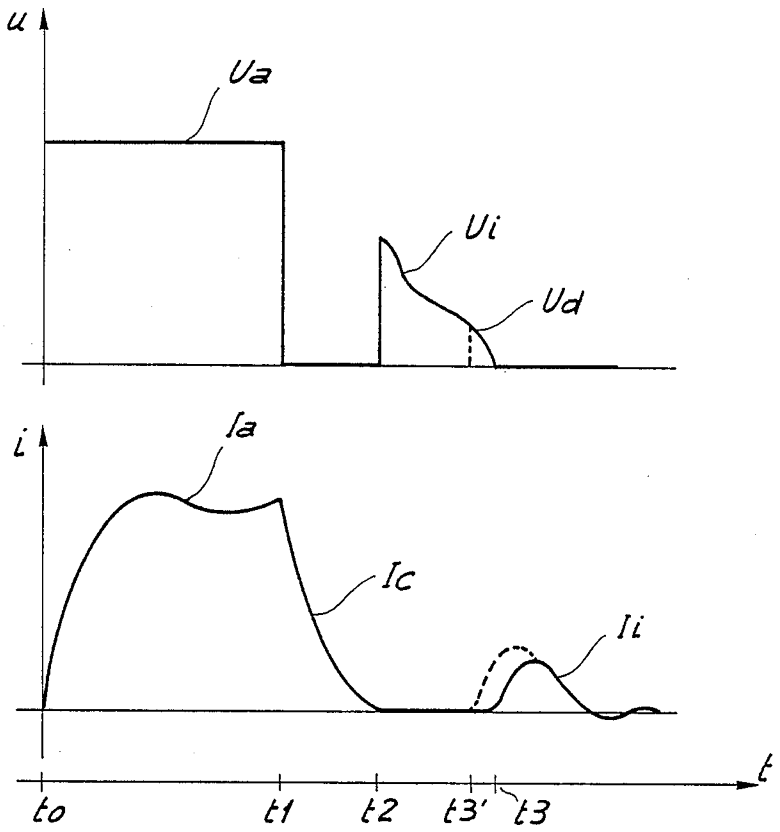
FIG. 1 illustrates the variation with respect to time t of the voltage u across the terminals of the coil of a stepping motor controlled by a method according to the invention and of the current i flowing through the coil.
Figure 2:
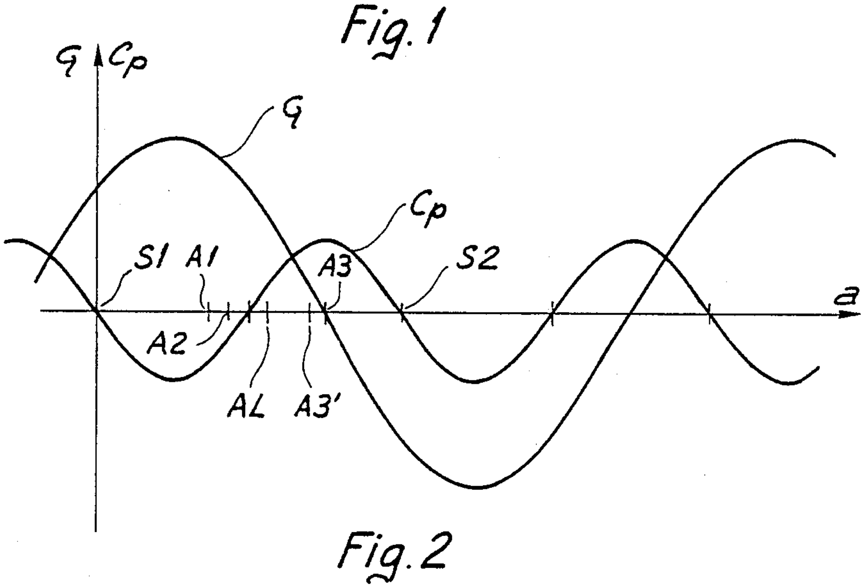
FIG. 2 illustrates the variation, in dependence on angular position a of the motor's rotor, of the positioning torque Cp and of the coupling factor G of its permanent magnet with the motor's coil.

FIGS. 1 and 2 illustrate the method according to the invention in a case, given by way of example, where it is carried out by a circuit of the constant voltage type comprising means for adjusting the duration of each drive pulse in dependence on the mechanical load driven by the rotor during this drive pulse.

In FIG. 1, the instant when the control circuit begins to apply the drive pulse to the motor is referenced t0 and the voltage applied to the coil during the drive pulse is referenced Ua.

It is being assumed that, at instant t0, the rotor is stopped in one of its positions of stable equilibrium, referenced S1 in FIG. 2, or very close to the latter, and that the polarity of voltage Ua is that which will cause the rotor to rotate towards its second position of stable equilibrium, referenced S2 in FIG. 2.

From instant t0, current i flowing in the coil in response to voltage Ua describes, in known manner, a curve similar to curve 1a in FIG. 1.

Further, the rotor rotates towards its second position of stable equilibrium S2 in response to the drive torque generated by the flow of current i through the coil.

It is assumed that the control circuit of the motor interrupts the drive pulse at an instant t1 by severing the link between the source of voltage Ua and the coil and by short-circuiting the latter. The control circuit determines instant t1 in dependence on the mechanical load being driven by the rotor, in a manner that depends on its structure.

At instant t1, the rotor is in an angular position, referenced A1. Practice has shown that position A1 is spaced from position S1 by an angle which is usually smaller than 60°.

From instant t1, the current i flowing through the coil begins to decrease following a curve, referenced Ic in FIG. 1, whose shape depends on the characteristics of the coil, i.e. its resistance and its inductivity, and on the voltage induced in the coil by the rotor's rotation, i.e. on the speed of the rotor and on the coupling factor between its permanent magnet and the coil.

As in known methods, the magnetic energy contained in the coil at instant t1 is converted into mechanical energy which helps to rotate the rotor towards position S2.

In the method according to the invention, the current i flowing through the coil is measured, at least from instant t1, and the instant when it becomes zero is detected. This instant is referenced t2 in FIG. 1.

At instant t2, the control circuit breaks off the short-circuiting of the coil and puts the latter on open circuit.

The rotor, having reached at instant t2 a position referenced A2 in FIG. 2, continues of course to rotate towards position S2.

From instant t2 onward, the voltage across the terminals of the coil, which was zero from instant t1, becomes equal to the voltage induced in the coil by the rotor's rotation. This voltage is referenced Ui in FIG. 1.

After a while, which also depends on the mechanical load being driven by the rotor, the latter reaches a position, referenced A3 in FIG. 2, at which the coupling factor G of its permanent magnet with the motor's coil becomes zero. Voltage Ui thus also becomes zero.

In the metod according to the invention, voltage Ui is measured, and the instant when it becomes zero is detected. This instant is referenced t3 in FIG. 1.

At instant t3, the control circuit short-circuits the motor's coil a second time. The motor's rotor reaches, at instant t3, a position A3 located between its threshold angular position defined above, referenced AL in FIG. 2, and its second position of stable equilibrium S2.

The rotor thus ends its rotation in response to its own kinetic energy and that of the components driven by it and to positioning torque Cp.

The current induced in the coil by this rotation, referenced Ii in FIG. 1, causes electrical braking of the rotor.

This braking action slows down the rotor which thus reaches its second position of stable equilibrium S2 at a relatively low speed. After a few possible oscillations, the rotor stops at position S2 or in a position very close to the latter.

The coil remains short-circuited until the beginning of the next drive pulse, after which the process described above is repeated. Between the drive pulses, the rotor is thus suitably maintained in the position of stable equilibrium in which it is located, as with the known control methods, by the combined effect of positioning torque Cp and of the electric braking torque due to the short-circuiting of the coil.

It should be noted that, for a motor controlled by the method according to the invention described above, current i cannot change direction after becoming zero at instant t2, since the coil is put on open circuit at that instant.

This is the opposite of what happens with known methods where the coil is permanently short-circuited between the drive pulses, or as with the method disclosed in U.S. Pat. No. 4,467,255 mentioned above in the case when the set time during which the coil is short-circuited is greater than the variable time taken by the current to become zero.

No electric braking torque is applied to the rotor of the motor being controlled by the method according to the invention between instants t2 and t3. The kinetic energy of the rotor and of the elements driven by it thus needs to overcome only the positioning torque, which opposes its rotation when it is in position A2, and the resisting torques of magnetic and mechanical origin mentioned earlier.

Moreover, no electrical energy is, of course, dissipated in the coil after instant t2. The control circuit of the motor can therefore be so sized that the amount of electrical energy having to be supplied to the motor during the drive pulse may be considerably decreased with respect to that having to be supplied to the motor being controlled by one of the known methods.

As mentioned earlier, this decrease can reach 25%, depending on the type of motor and the type of control circuit.

For a given size, and therefore a given capacity, of supply source for a device comprising a motor controlled by the method according to the invention, the lifetime of the source is thus substantially increased, or, for a given lifetime, the size may be considerably reduced.

Also, the method according to the invention ensures that the motor's coil is put on open circuit only when all of the magnetic energy present in the coil at the end of a drive pulse, i.e. at instant t1, has been used and converted into mechanical energy (disregarding losses due to the flow of current through the coil).

This is the opposite of what happens with the method described in U.S. Pat. No. 1,467,255 in the case when the set time during which the coil is short-circuited is shorter than the (variable) time taken by the current to become zero.

In such a case, the method according to the invention thus also enables a saving in electrical energy.

Further, the method according to the invention also ensures that, at instant t3 when the motor's coil is again short-circuited, position A3 for the rotor lies between its threshold angular position AL and its second stable equilibrium position S2. The rotor can thus be certain to finish its step solely in response to its positioning torque.

Additionally, position A3 is certain to be sufficiently distant from position S2 for the rotor not to travel too far beyond the latter and to run the risk of performing an inadvertent extra step.

The method according to the invention thus improves the safety of the operation of the motor as compared with the method disclosed in U.S. Pat. No. 4,467,255.

FIGS. 1 and 2 also illustrate a modification of the method according to the invention. In this modification, it is instant t3' when induced voltage Ui reaches a predetermined value Ud which is being detected while the coil is on open circuit, after instant t2, instead of instant t3 when voltage Ui becomes zero, and the coil is short-circuited again, at this instant t3'.

The curves drawn with broken lines in FIG. 1 show the variation of voltage Ui and of current Ii in this modification, and the angular position reached by the rotor at instant t3' is referenced A3' in FIG. 2.

This modification differs only slightly from the above-described method and provides the same advantages as the latter compared with known methods.

Compared with the method described earlier, this modification has the advantage of reducing somewhat the time during which the motor's coil is on open circuit, and during which the rotor is thus more sensitive to accidental angular accelerations due to, e.g., shocks.

Figure 3:
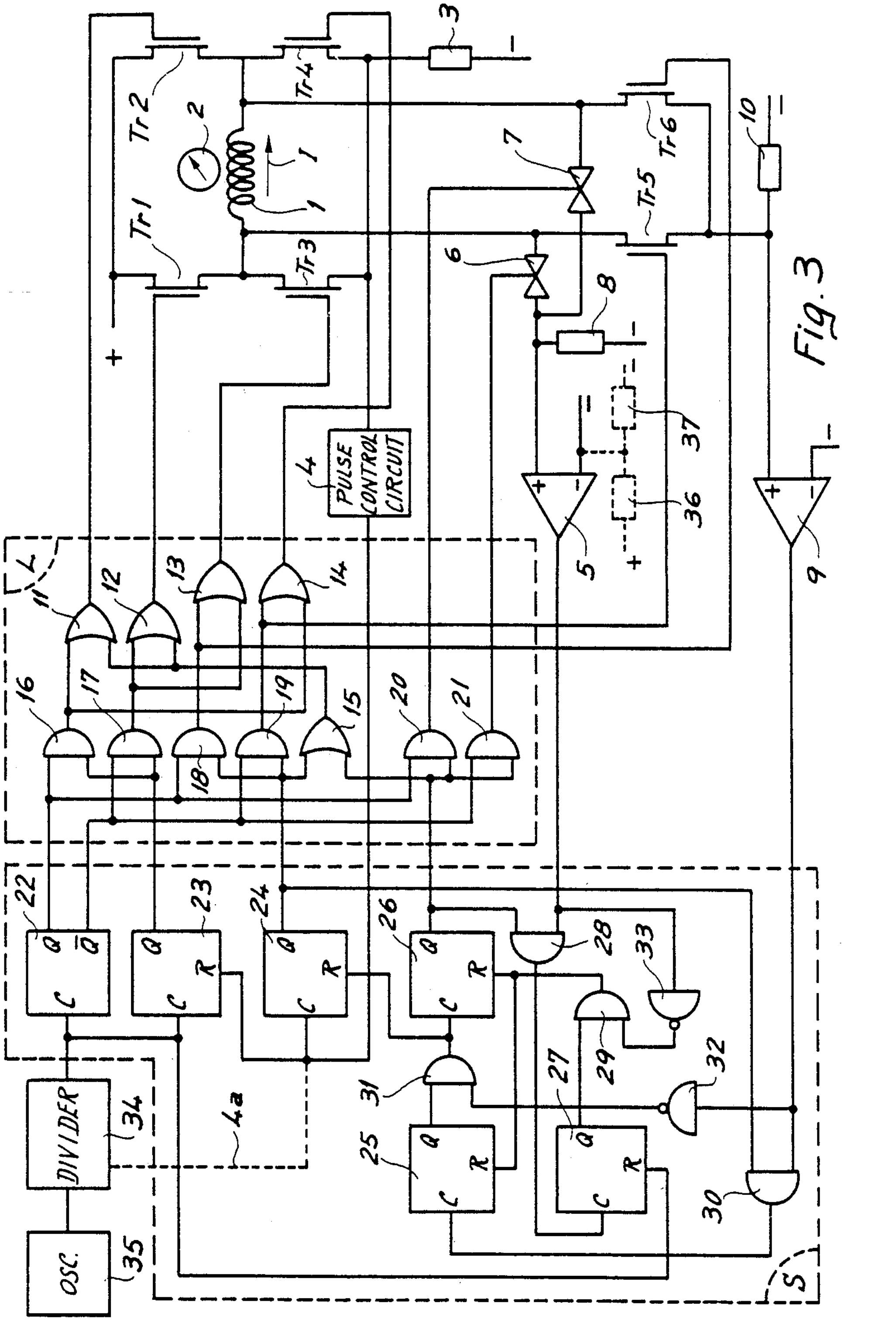
FIG. 3 is a diagram of a device for carrying out the above method.

FIG. 3 is a diagram, given by way of example, of a circuit for carrying out the first method described above.

This circuit forms part of an electronic timepiece whose display means, not shown, are made up of hands or discs and are driven by a stepping motor of the kind described above, symbolized by its coil 1 and the permanent magnet 2 of its rotor.

The circuit shown in FIG. 3 has a conventional drive pulses generating which comprises four MOS transistors Tr1, Tr2, Tr3 and Tr4.

Transistors Tr1 and Tr2 are of p type, and their source is connected to the positive terminal of a supply source not shown. This positive terminal is symbolized by the sign +.

Transistors Tr3 and Tr4 are of n type, and their source is connected, via a resistor 3 of small value, to the negative terminal of the supply source symbolized by the sign −. The function of resistor 3 will be described later.

The drains of transistors Tr1 and Tr3 are connected, together, to one of the terminals of coil 1, and the drains of transistors Tr2 and Tr4 are connected, together, to the second terminal of coil 1.

The electronic circuits that will be described later are also supplied by the above mentioned source. In accordance with accepted practice, the logic levels of the inputs and outputs of the logic gates, inverters and flip-flops that form part of these electronic circuits are referred to as "low" when their potential is substantially equal to that of the negative terminal − of the supply source, and as "high" when their voltage is substantially equal to that of the positive terminal + of the source.

Consequently, transistors Tr3 and Tr4, as well as the other MOS transistors of n type described below, are blocked when their gate is low and conductive when their gate is high. Transistors Tr1 and Tr2, on the other hand, are blocked when their gate is high and conductive when their gate is low.

The sources of transistors Tr3 and Tr4 are connected to the input of a circuit 4 which determines the length of each drive pulse in dependence on the mechanical load being driven by the rotor of the stepping motor during said drive pulse.

Circuit 4 is similar to, e.g., that described in U.S. Pat. No. 4,446,413 mentioned earlier. The latter circuit calculates permanently, during each drive pulse, the value of the voltage induced in coil 1 by the rotation of magnet 2 of the rotor. It performs this calculation using the voltage generated across the terminals of resistor 3 by the current flowing through coil 1. This circuit determines the value of the mechanical load being driven by the rotor by measuring the time taken by the induced voltage to reach a predetermined value. It then determines the optimal instant at which the drive pulse should be interrupted in dependence on the measured time, and generates on its output a signal which goes high at this optimal instant.

The terminals of coil 1 are connected to the non-inverting input of a differential amplifier 5 via two transmission gates 6 and 7. This non-inverting input is also connected to the negative terminal − of the supply source via a resistor 8. The inverting input of amplifier 5 is connected directly to the negative terminal −.

The terminals of coil 1 are also connected to the drains of two n-type MOS transistors Tr5 and Tr6 whose sources are connected, together, to the non-inverting input of a differential amplifier 9 and, via a resistor 10, to the negative terminal − of the supply source. The inverting input of amplifier 9 is connected directly to the negative terminal −.

Amplifiers 5 and 9 both provide a large amplification, such that their output acquires the potential of the positive terminal + of the supply source, i.e. goes high, as soon as their non-inverting input has a potential which is positive with respect to the potential of the negative terminal − of the source. The output of amplifiers 5 and 9 has the potential of the negative terminal − of the supply source, i.e. goes low, when the potential at their non-inverting input is equal to the potential at their inverting input, or negative with respect to the latter.

Transmission gates 6 and 7 are blocked when their control electrode is low, and conductive when their control electrode is high.

The gates of transistors Tr1 and Tr6 and the control electrodes of transmission gates 6 and 7 are connected to the outputs of a logic circuit L comprising OR gates 11 to 15 and AND gates 16 to 21.

The connections of the inputs and of the outputs of gates 11 to 21 with each other and with the gates of transistors Tr1 to Tr6 and the control electrodes of transmission gates 6 and 7 will not be described in detail as they are made clear in the drawing. Furthermore, the functions performed by gates 11 to 21, described later, may also be performed by other logic circuits comprising other gates interconnected differently.

The inputs of gates 15 to 21, which form the inputs of logic circuit L, are connected to the outputs of a sequential circuit S comprising flip-flops 22 to 27, AND gates 28 to 31 and inverters 32 and 33.

Flip-flops 22 to 27 are all of T type, i.e. their output Q changes its state whenever their clock input C switches from low to high, provided however that their reset input R is low. If input R is high, their output Q is kept low whatever the state of their input C.

The links between the inputs of logic circuit L and the outputs of sequential circuit S, and the connections of the inputs and outputs of the components of sequential circuit S will not be described in detail either, for reasons similar to those given above concerning logic circuit L.

Finally, the inputs of sequential circuit S are connected to the outputs of circuit 4 for determining the length of the drive pulses, of amplifiers 5 and 9, and of a frequency divider 34 which forms, together with an oscillator 35, the time base of the timepiece.

The operation of the circuit shown in FIG. 3 will now be described with reference to FIGS. 1, 2 and 4.

Figure 4:
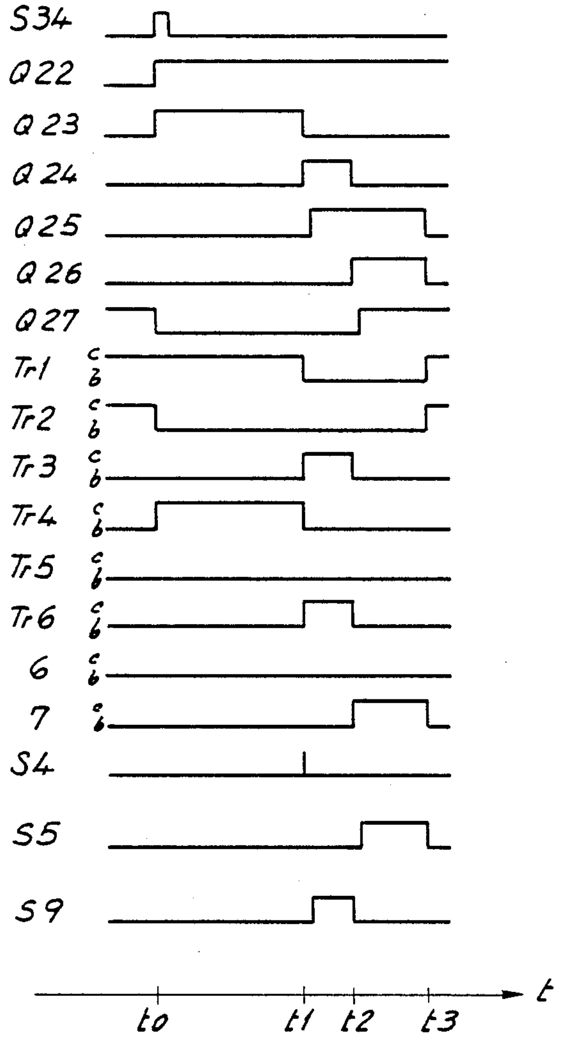
FIG. 4 is a diagram showing signals measured at various points of the circuit shown in FIG. 3 and the state of certain components used in FIG. 3.

In FIG. 4, the graphs referenced S34, S4, S5 and S9 show respectively the logic states of the outputs of frequency divider 34, of circuit 4 and of amplifiers 5 and 9. The graphs referenced Q22 to Q27 show respectively the logic states of the outputs Q of flip-flops 22 to 27. Finally, the graphs referenced Tr1 to Tr6, 6 and 7 show respectively the blocked state, referenced b, or the conductive state, referenced c, of transistors Tr1 to Tr6 and of transmission gates 6 and 7.

Instants t0 to t3 in FIG. 4 are identical to instants t0 to t3 in FIG. 1.

It will become clear from the following description that, immediately before the beginning of each drive pulse, the outputs Q of flip-flops 23 to 26 are low and the output Q of flip-flop 27 is high.

It will be assumed that, at the outset of this description, the output Q of flip-flop 22 is low.

Under these conditions, the gates of transistors Tr1 to Tr6 and the control electrodes of transmission gates 6 and 7 will be low. Transistors Tr1 and Tr2 are thus conductive, and transistors Tr3 and Tr6 and transmission gates 6 and 7 are blocked.

Coil 1 is therefore short-circuited via transistors Tr1 and Tr2. The electric braking due to this short-circuit is additional to the effect of the positioning torque of the rotor to maintain the latter in the position of stable equilibrium it is in. It will be assumed that, at the start of this description, this position is that referenced S1 in FIG. 2.

Transistors Tr3 to Tr6 and transmission gates 6 and 7 being blocked, the input of circuit 4 and the non-inverting inputs of amplifiers 5 and 9 are kept low respectively via resistors 3, 8 and 10. The outputs of circuit 4 and of amplifiers 5 and 9 are therefore also low.

Frequency divider 34 issues a pulse whenever the rotor of the motor is required to rotate by one step, for instance every second.

One of these pulses is generated at instant t0 in FIGS. 1 and 4. In response to this pulse, the output Q of flip-flop 27 goes low and the outputs Q of flip-flops 22 and 23 go high. In response to the latter high logic states, transitors Tr2 becomes blocked and transistors Tr4 becomes conductive.

A drive pulse is thus applied to coil 1 whose terminals are connected respectively to the positive terminal + of the supply source via transistor Tr1 and to the negative terminal − of the supply source via transistor Tr4 and resistor 3.

A current begins to flow through coil 1 in response to this drive pulse, in the direction shown by arrow I, and the rotor of the motor begins to rotate.

Further, a voltage that is proportional to this current is applied to the input of circuit 4 for determining the length of the drive pulse.

At instant t1, which is spaced from instant t0 by a length of time that depends on the value of the mechanical load being driven by the motor's rotor, the conditions laid down by the make-up of circuit 4 are satisfied, and the output of circuit 4 goes high, thus indicating the end of the drive pulse.

The output Q of flip-flop 23 goes low again and the output Q of flip-flop 24 goes high.

In response to this high state, transistors Tr1 and Tr4 become blocked, whereas transistors Tr3 and Tr6 become conductive. Coil 1 is thus cut off from the positive terminal + of the supply source, and short-circuited via transistor Tr6, resistors 10 and 3 and transistor Tr3.

The current that was flowing through the coil can thus continue to flow, but now via, in particular, resistor 10. After a very short time, the output of amplifier 9 goes high thus causing the output Q of flip-flop 25 to go high. As the output of inverter 32 simultaneously goes low, the circuit remains in this state.

The current that still flows through coil 1 generates a drive torque which combines with the torque due to the inertia of the rotor and of the mechanical components driven by it in order to cause the rotor to carry on rotating.

The current flowing through coil 1 decreases rapidly. When it becomes zero, at instant t2, the output of amplifier 9 goes low and the output of inverter 32 thus goes high, thereby causing the output Q of flip-flop 24 to go low and the output Q of flip-flop 26 to go high.

In response to the latter high state, transistors Tr3 and Tr6 become blocked. Coil 1 is thus put on open circuit and no current can then flow through it.

The motor's rotor, however, continues to rotate in response to its own kinetic energy and to that of the mechanical components driven by it, but it is not braked electrically as no current flows through coil 1 after instant t2.

Between the angular position A2 of the rotor at instant t2 and threshold angular position AL defined above, the kinetic energy of the rotor and of the mechanical components driven by it needs thus to overcome only the aggregate of positioning torque Cp and of the resisting torques of magnetic and mechanical origin mentioned above. Beyond threshold angular position AL, the positioning torque, which has changed its direction, is added to that generated by the remaining kinetic energy to rotate the rotor.

With the output Q of flip-flop 26 going high at instant t2, transmission gate 7 becomes conductive. The voltage induced in coil 1 by the rotor's rotation is thus applied to the input of amplifier 5 whose output goes high after a very short time. The output Q of flip-flop 27 thus goes high. Since the output of inverter 33 simultaneously goes low, the outputs Q of flip-flops 25 and 26 remain high.

When the rotor reaches position A3 at instant t3, the coupling factor of its permanent magnet 2 with coil 1, and hence the voltage induced in coil 1, become zero. The output of amplifier 5 thus goes low, and that of inverter 33 goes high.

In response to this latter high state, the outputs Q of flip-flops 25 and 26 go low.

Consequently, transmission gate 7 is again blocked and transistors Tr1 and Tr2 become conductive again, thereby causing coil 1 to be short-circuited again. The rotor is thus again braked electrically. But positioning torque Cp now has a direction such that it causes the rotor to rotate up to the position of stable equilibrium S2 in FIG. 2 with no supply of energy. The electric braking action due to the short-circuiting of coil 1 and positioning torque Cp causes rapid damping of the oscillations of the rotor in the region of position S2, and also ensure that it remains later in this position.

After instant t3, the FIG. 3 circuit is again in exactly the same state as it was before instant t0, except for the output Q of flip-flop 22 which is now high. The FIG. 3 circuit remains in this state until the output of frequency divider 34 generates a new pulse.

The operation of the FIG. 3 circuit in response to this new pulse will not be described in detail as it is very similar to that described earlier.

In response to the new pulse, transistor Tr1 becomes blocked and transistor Tr3 becomes conductive. The drive pulse thus applied to coil 1 is of opposite polarity to that described above and the current in coil 1 in response to the drive pulse flows in a direction opposite to that of arrow 1.

The voltage proportional to this current has however the same polarity as above.

The high state generated by circuit 4 in response to this voltage at the instant when the drive pulse being applied must be stopped causes, as in the previous case, coil 1 to be short-circuited. But in this case, the short-circuiting is performed through transistor Tr5, again through resistors 10 and 3 and through transistor Tr4.

As above, the voltage generated in resistor 10 by the current that continues to flow through the coil is applied to the non-inverting input of amplifier 9.

When this current becomes zero, the output of inverter 32 again goes high. Again as above, this high state causes coil 1 to be put on open circuit and voltage Ui, induced in coil 1, to be applied to the non-inverting input of amplifier 5. In this case, however, voltage Ui is applied to this input of amplifier 5 via transmission gate 6 which is now in a conductive state.

When voltage Ui becomes zero, the output of inverter 29 again goes high. Again as above, this high state causes transistors Tr1 and Tr2 to become conductive again and hence causes coil 1 to be short-circuited via transistors Tr1 and Tr2.

The FIG. 3 circuit is again in exactly the same state as before at instant t0, and it remains in this state until frequency divider 34 generates a new pulse. This new pulse has of course the same effect as that generated at instant t0.

A modification of the circuit described above is also shown in FIG. 3.

In this modification the inverting input of amplifier 5 is not connected to the negative pole — of the supply source, but to a source of a reference voltage comprising, e.g., a voltage divider made up of two resistors connected in series between the positive pole + and the negative pole — of the device's supply source. These resistors are shown in broken lines in FIG. 3 and are referenced 36 and 37.

Resistors 36 and 37 have a value such that the voltage they apply to the non-inverting input of amplifier 5 is the voltage Ud mentioned above.

This modification of the FIG. 3 circuit serves, as will readily be perceived, to carry out the modified method described earlier. Indeed, in this modified version of the circuit, the output of amplifier 5 goes low at the instant when the voltage induced in coil 1 while the latter is put on open circuit reaches value Ud, i.e. at instant t3'.

The invention is also well suited to the control of any kind of stepping motor, whether it comprises one or several coils and/or a bipolar or multipolar permanent magnet coupled with the coil via a stator or without a stator.

The invention is also applicable to whatever manner of controlling the motor is restored to, i.e. with drive pulses that all have the same polarity or that have alternating polarities.

Further, the control circuit for the motor may comprise a circuit 4 for determining the length of the drive pulses that is different from that described.

This circuit 4 may be of a kind that determines the mechanical load being driven by the rotor after the end of the drive pulses and that adjusts the duration of the following drive pulses in dependence on this mechanical load.

Circuit 4 may also not exist. The input of circuit S that is connected in the example described above to the output of circuit 4 may then, for instance, be connected to an input of frequency divider 34 that issues a signal at instants separated from each instant t0 by a time of set length. A connection of this kind is shown by a broken line 4a in FIG. 3. In such a case, the length of the drive pulses is of course fixed and equal to the length of time decribed above.

Furthermore, the device comprising a motor controlled according to the invention may not be a timepiece. It may be, for instance, a device for measuring some physical magnitude, such as temperature or pressure, and displaying the value of this physical magnitude by means of one or more hands driven round by the motor before a dial. In such a case, the pulses causing the drive pulses to be applied to the coil of the motor are, obviously, not necessarily periodic.

I claim:

1. A method for controlling a stepping motor comprising a coil and a rotor including a permanent magnet that is magnetically coupled to the coil, said method comprising the steps of:

applying a drive pulse to the coil whenever the rotor is required to rotate by one step;

short-circuiting the coil a first time at the end of the drive pulse;

measuring the current flowing through the coil during said first short-circuiting;

open-circuiting the coil in response to said measured current reaching a zero value;

measuring the voltage which is induced in the coil by the rotation of the rotor during said open-circuiting;

short-circuiting the coil a second time in response to said measured voltage reaching a predetermined value;

and maintaining said second short-circuiting until the beginning of the next drive pulse.

2. The method of claim 1, wherein said predetermined value of said measured voltage is zero.

3. A device for controlling a stepping motor comprising a coil and a rotor including a permanent magnet that is magnetically coupled to the coil, said device comprising:

means for applying a drive pulse to the coil whenever the rotor is required to rotate by one step;

means for short-circuiting the coil a first time at the end of said drive pulse;

means for measuring the current flowing in the coil during said first short-circuiting;

means responsive to said measured current reaching a zero value for open-circuiting the coil;

means for measuring the voltage which is induced in the coil by the rotation of the rotor during said open-circuiting; and means responsive to said measured voltage reaching a predetermined value for short-circuiting the coil a second time and for maintaining said second short-circuiting until the beginning of the next drive pulse.

4. The device of claim 3, wherein said predetermined value of said induced voltage is zero.

* * * * *